Figure 1:
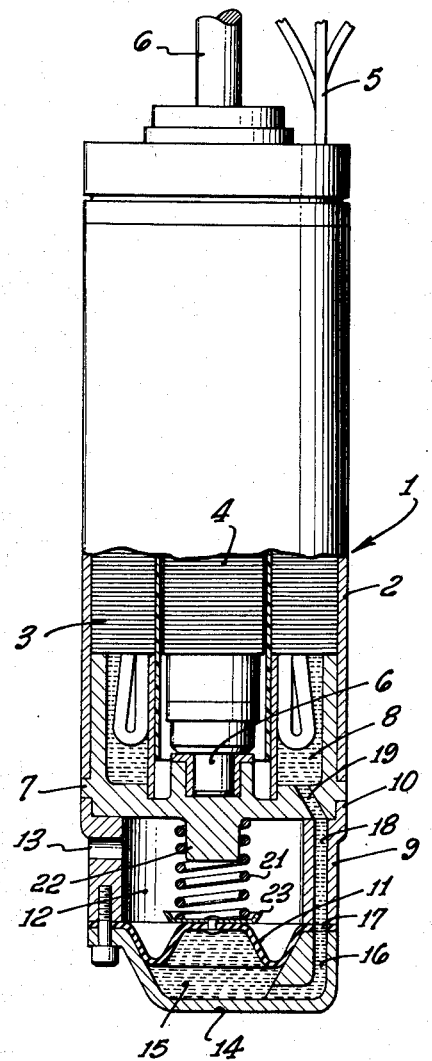

Jan. 8, 1963  F. O. LUENBERGER  3,072,810
SUBMERSIBLE ELECTRIC MOTOR
Filed Dec. 28, 1959

FREDERICK O. LUENBERGER
INVENTOR.

BY Flam and Flam
ATTORNEYS.

United States Patent Office 3,072,810
Patented Jan. 8, 1963

3,072,810
SUBMERSIBLE ELECTRIC MOTOR
Frederick O. Luenberger, Los Angeles, Calif., assignor, by mesne assignments, to The Emerson Electric Manufacturing Company, St. Louis, Mo., a corporation of Missouri
Filed Dec. 28, 1959, Ser. No. 862,167
2 Claims. (Cl. 310—87)

This invention relates to submersible electric motors.

It is common to provide liquid filling within the motor casing in order to exclude air or other undesired impurities from the motor. Such liquid filling may be water. A flexible diaphragm serves as a sealing wall at the bottom of the motor so as to maintain the liquid pressure in the motor substantially the same as the liquid pressure in the well in which the motor is submerged.

Should the flexible diaphragm burst for any reason, such as by continuous flexing or excessive pressure, air entrained in the well liquid can rise through the breach and cause corrosion or other damage to the motor.

It is one of the objects of this invention to prevent or retard the rise of air or other injurious impurities into the motor in the event that the diaphragm should rupture.

In order to accomplish this result, the flexible diaphragm is so arranged as to be below rather than above the well water, the well water occupying a position between the bottom of the motor and the diaphragm.

Accordingly, it is another object of this invention to provide a submersible motor into which entry of foreign matter past a ruptured diaphragm must occur only by passing downwardly through the diaphragm.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Figure 2:
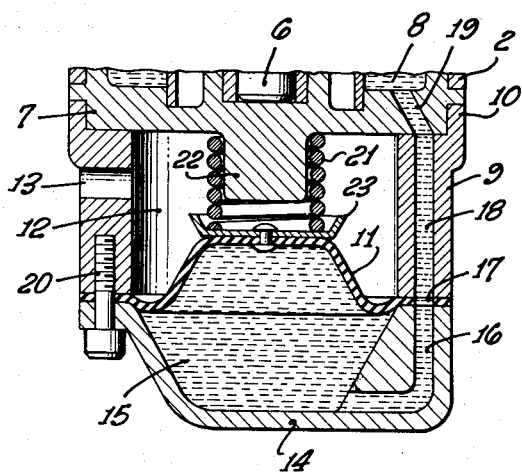

Referring to the drawings:

FIGURE 1 is a view, partly in longitudinal section, of a submersible motor incorporating the invention; and FIG. 2 is an enlarged fragmentary sectional view of the lower portion of the motor structure.

The motor 1 has an external metal casing 2 of generally cylindrical form. In this casing are appropriately supported the stator 3 and the rotor 4. Extending from the top of the casing 2 are insulated leads 5 which may extend to the top of the well. A drive shaft 6 coupled to the motor 1 may be used for operating an appropriate load, such as a pump or the like.

A bracket structure 7 is telescoped within the cylindrical casing 2, and provides an appropriate bearing for the rotor shaft 6.

The interior of the casing 2 may be filled with a liquid 8, such as water. The liquid 8 may be in contact with both the stator and rotary elements 3 and 4, if desired.

Attached to the lower end of the motor is an extension or shell 9. This shell 9 has a flange 10 appropriately telescoping over and firmly joined to the outer periphery of the bracket 7. A flexible diaphragm 11 defines with the shell or extension 9 a chamber 12, which is ported by the aid of an aperture 13 to the exterior of the motor 1. In this way, well water may enter into the chamber 12.

Immediately below the extension 9 is a cup-like member 14 defining a chamber 15, which is in communication with the interior of the casing 2. This may be effected by the aid of a port 16 in the member 14, an aperture 17 near the edge of the flexible wall of the diaphragm 11, a port 18 extending longitudinally of the shell 9, and a port 19 located in the bracket 7. A plurality of cap screws 20 serve to clamp the edge of the diaphragm 11 between the contiguous surfaces of the shell 9 and the member 14.

A compression spring 21 urges the diaphragm 11 downwardly. Its upper end is guided by the cylindrical boss 22 shown, in this instance, as integrally formed on the bottom of the bracket 7. Its lower end rests upon the bottom of a cup washer 23 appropriately attached to the upper side of the diaphragm 11.

Due to the influx of well water through the aperture or opening 13, the diaphragm 11 takes a position such that the internal fluid pressure is substantially equalized with the well pressure.

Well water extending into chamber 12 forms a layer of well liquid between the lower end of the casing 2 and the diaphragm 11. Thus, should the diaphragm 11 rupture or burst for any reason due to continued flexure or excessively high fluid pressure, any air entrained in the well water will find its passage to the well upwardly through the port 13. Little, if any, of the air can reach the ports 16, 18 or 19 to be received in the casing 2. In this way, corrosive or other damage is substantially entirely obviated.

In the position shown in FIG. 2, the spring 21 is at its maximum compression. As the body of liquid or water 8 may slowly ooze out of the casing 2, the spring 21 will expand in order to maintain the casing 2 completely filled. FIG. 1 illustrates an intermediate position of the diaphragm 11.

The inventor claims:

1. In a submersible electric motor: a casing for the motor; said casing having an end wall; an extension attached at one end to the end wall; a diaphragm closing the opposite end of the extension; said extension having an opening to vent the interior of the extension to the exterior of the casing; and means forming with the outer surface of the diaphragm, a liquid chamber; said casing and the chamber being filled with liquid, and being in communication with each other; the normal position of the motor in use being such that the liquid chamber is below the motor; and the space in the extension is disposed between the motor and the chamber, and is normally filled with the liquid in which the motor is submerged.

2. The combination as set forth in claim 1, with the addition of resilient means urging the diaphragm in a direction to increase the pressure of the liquid in the casing.

References Cited in the file of this patent
UNITED STATES PATENTS

| | | |
|---|---|---|
| 1,970,484 | Arutunoff | Aug. 14, 1934 |
| 2,739,252 | Patterson et al. | Mar. 20, 1956 |
| 2,790,916 | Hinman | Apr. 30, 1957 |
| 2,922,055 | Deters | Jan. 19, 1960 |